United States Patent
Ma et al.

(10) Patent No.: US 7,424,484 B2
(45) Date of Patent: Sep. 9, 2008

(54) PATH-BASED RANKING OF UNVISITED WEB PAGES

(75) Inventors: Xiaochuan Ma, Beijing (CN); Yue Pan, Beijing (CN); Hui Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 10/358,941

(22) Filed: Feb. 5, 2003

(65) Prior Publication Data
US 2003/0149694 A1    Aug. 7, 2003

(30) Foreign Application Priority Data
Feb. 5, 2002    (CN) ................................. 02 1 03529

(51) Int. Cl.
*G06F 17/30* (2006.01)
(52) U.S. Cl. ................................. 707/102; 707/3; 707/6
(58) Field of Classification Search ...................... 707/3, 707/6, 102
See application file for complete search history.

(56) References Cited
U.S. PATENT DOCUMENTS

| | | | |
|---|---|---|---|
| 6,510,406 B1 * | 1/2003 | Marchisio ........................ 707/3 |
| 6,597,377 B1 * | 7/2003 | MacPhail ..................... 715/738 |
| 6,728,779 B1 * | 4/2004 | Griffin et al. ................. 709/239 |
| 2003/0018626 A1 * | 1/2003 | Kay et al. ........................ 707/3 |
| 2003/0131097 A1 * | 7/2003 | Kasriel et al. ................ 709/224 |

* cited by examiner

*Primary Examiner*—Apu Mofiz
*Assistant Examiner*—Cam Linh Nguyen
(74) *Attorney, Agent, or Firm*—Ference & Associates LLC

(57) ABSTRACT

Path-based ranking of unvisited Web pages for WWW crawling is provided, via identifying all the paths beginning with a "seed" URL and leading to visited relevant web pages as "good-path set", and for each unvisited web page, identifying the paths beginning from the "seed" URL leading to it as "partial-path set"; classifying all the visited web pages and labeling each web Page with the labels of a class or classes it belongs to; training a statistic model for generalizing the common patterns among all ones of "good-path set"; and evaluating the "partial-path set" with the statistic model and ranking the unvisited web pages with the evaluation results.

8 Claims, 4 Drawing Sheets

US 7,424,484 B2

PATH-BASED RANKING OF UNVISITED WEB PAGES

CLAIM FOR PRIORITY

This application claims priority from Chinese Application No. 02 1 03529.6, filed on Feb. 5, 2002, which is hereby incorporated by reference.

FIELD OF THE INVENTION

The invention relates to network information searching, and in particular to a method and system for path-based ranking of unvisited Web pages for WWW crawling.

BACKGROUND OF THE INVENTION

Existing general purpose search engines provide valuable assistance to users in locating the information relevant to their needs on the World Wide Web. However, they are unsatisfactory when users try to find in-time information for a narrow query in a specific domain. It is estimated that only 30-40% of the Web pages are collected and put into the search engine index by the largest crawls, and the complete refreshing takes several weeks to a month, thus much of the up-to-date information is out of the search scope. Another drawback of general search engines is: it makes a loss of much information in the Web pages, while it enables fast searching to build a content index.

"Focused crawling" is recognized as a promising solution to satisfy the above search requirements. It can collect the useful information with a very limited resource. For example, users are already using PC based "Focused crawling" implementations. It can also exploit plentiful information hidden in the original web pages as well as the web topology to make more accurate judgment about the relevance.

"Focused crawling" is an intelligent way to crawl the Word Wide Web and collects only the web pages relevant to a specific information need. In particular, the "crawler" begins from a "seed" web page and intelligently visits other web pages following the links in the "seed" web page. And then, the "crawler" follows the links in visited web pages. As this process goes on, the number of possible links or their target web pages increases in an explosion way. The challenge is how to make the "crawler" visit as many relevant web pages as possible given that the number of total visited web pages is limited by time, network bandwidth and other resource restrictions. In the implementation of a "crawler", the challenge is boiled down to make decisions on which among the unvisited web pages should be visited in priority.

Known ranking methods only took advantage of "local" information in the web page. The "local" information in a web page includes the number of in-links, keywords and their positions, etc. However, the paths do contain valuable information for "focused crawling". For example, usually you can find research projects on artificial intelligence with a path like "University homepage"—"Academies"—"College (school, department) of Computer Science"—"Research Areas". Actually, people share a similar knowledge structure and they cope the structure when building the web site thus make similar patterns. This invention meets the challenge with a novel way to rank candidate web pages (represented by the URLs pointing them) by path-based ranking the pages so that optimal crawling is made.

SUMMARY OF THE INVENTION

In accordance with at least one presently preferred embodiment of the present invention, there is broadly contemplated a system which path-based ranks unvisited Web pages. The system can be built as a stand-alone marketable software product, an addition to another system, or as a service such as a web-based service.

In summary, one aspect of the invention provides a method for path-based ranking of unvisited Web pages for WWW crawling, comprising: identifying all the paths beginning with a "seed" URL and leading to visited relevant web pages as "good-path set", and for each unvisited web page, identifying the paths beginning from the "seed" URL leading to it as "partial-path set"; classifying all the visited web pages and labeling each web page with the labels of a class or classes it belongs to; training a statistic model for generalizing the common patterns among all ones of good-path set; and evaluating the partial-path sets with the statistic model and ranking the unvisited web pages with the evaluation results.

A further aspect of the present invention provides a method for deploying computing infrastructure, comprising integrating computer readable code into a computing system, wherein the code in combination with the computing system is capable of performing a method for path-based ranking of unvisited Web pages for WWW crawling, comprising at least one of the following: identifying all the paths beginning with a "seed" URL and leading to visited relevant web pages as "good-path set", and for each unvisited web page, identifying the paths beginning from the "seed" URL leading to it as "partial-path set"; classifying all the visited web pages and labeling each web page with the labels of a class or classes it belongs to; training a statistic model for generalizing the common patterns among all ones of good-path set; and evaluating the partial-path sets with the statistic model and ranking the unvisited web pages with the evaluation results.

An additional aspect of the present invention provides a system for path-based ranking of unvisited Web pages for WWW crawler, comprising: a storer which stores "good-path set" and "partial-path set"; a classifier and a labeler which classifies all the visited web pages and labels each web page with the labels of a class or classes it belongs to; a statistic modeler which trains a statistic model for generalizing the common patterns among all ones of "good-path set"; and an evaluator which evaluates the "partial-path set" with the statistic model and ranking the unvisited web pages with the evaluation results.

A further additional aspect of the present invention provides a program storage device readable by machine, tangibly embodying a program of instructions executable by the machine to perform method steps for path-based ranking of unvisited Web pages for WWW crawling, said method comprising the steps of: identifying all the paths beginning with a "seed" URL and leading to visited relevant web pages as "good-path set", and for each unvisited web page, identifying the paths beginning from the "seed" URL leading to it as "partial-path set"; classifying all the visited web pages and labeling each web page with the labels of a class or classes it belongs to; training a statistic model for generalizing the common patterns among all ones of good-path set; and evaluating the partial-path sets with the statistic model and ranking the unvisited web pages with the evaluation results.

For a better understanding of the present invention, together with other and further features and advantages thereof, reference is made to the following description, taken

DESCRIPTION OF THE PREFERRED EMBODIMENTS

Figure 1:
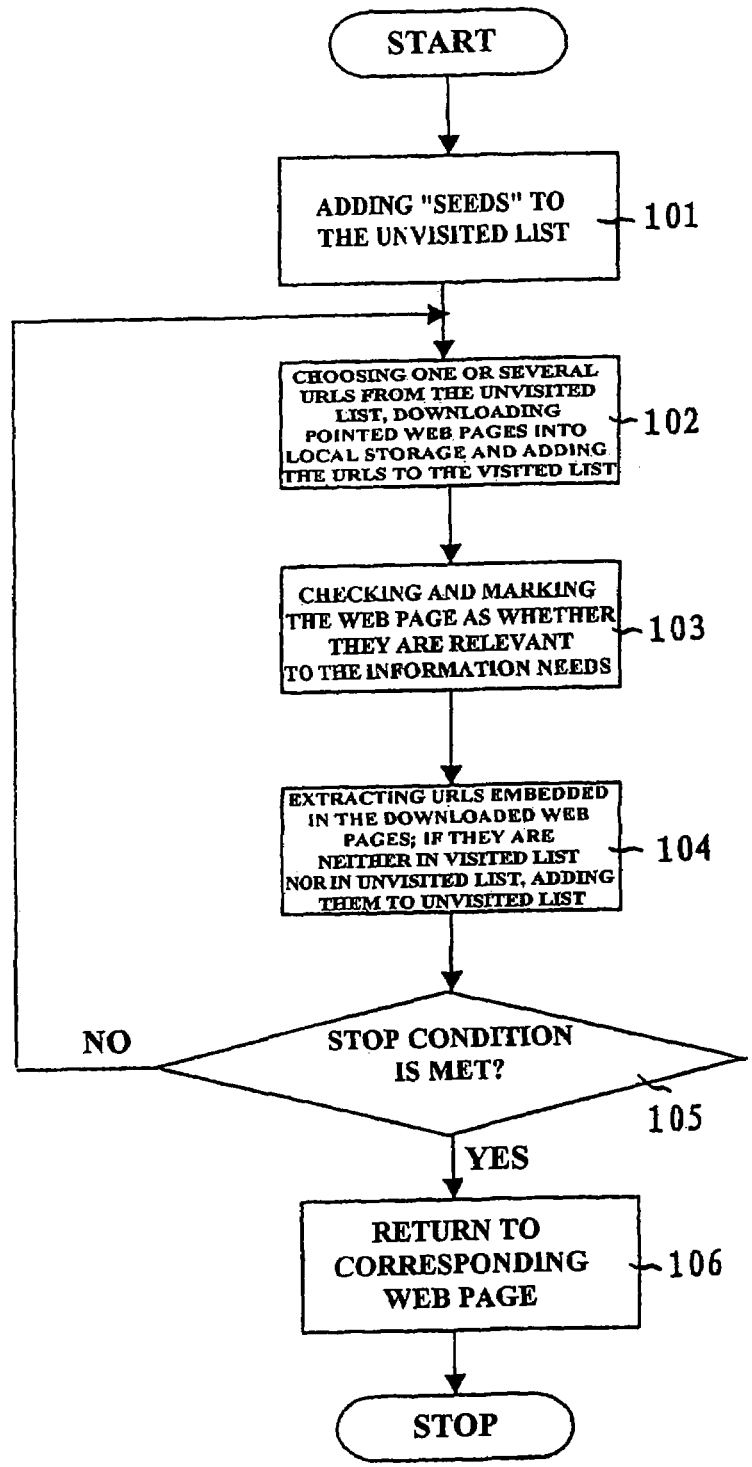
FIG. 1 shows a conventional crawling process.

Referring now to FIG. 1, the crawling process goes as followings:

(101) Adding "seeds" to the unvisited list;

(102) Choosing one or several URLs from the unvisited list, downloading pointed web pages into local storage and adding the URLs to the visited list;

(103) Checking and marking the web page as whether they are relevant to he information needs;

(104) Extracting URLs embedded in the downloaded web pages; if they are neither in visited list nor in unvisited list, adding them to unvisited list;

(105) If stop condition is met, stop the process and returned to the web pages marked relevant, otherwise back to (102).

The invention concerns step (102) where decisions are made on which links should be followed. The method and system for path-based ranking of unvisited Web pages according to the invention improves the efficiency of the total crawling.

Figure 2:
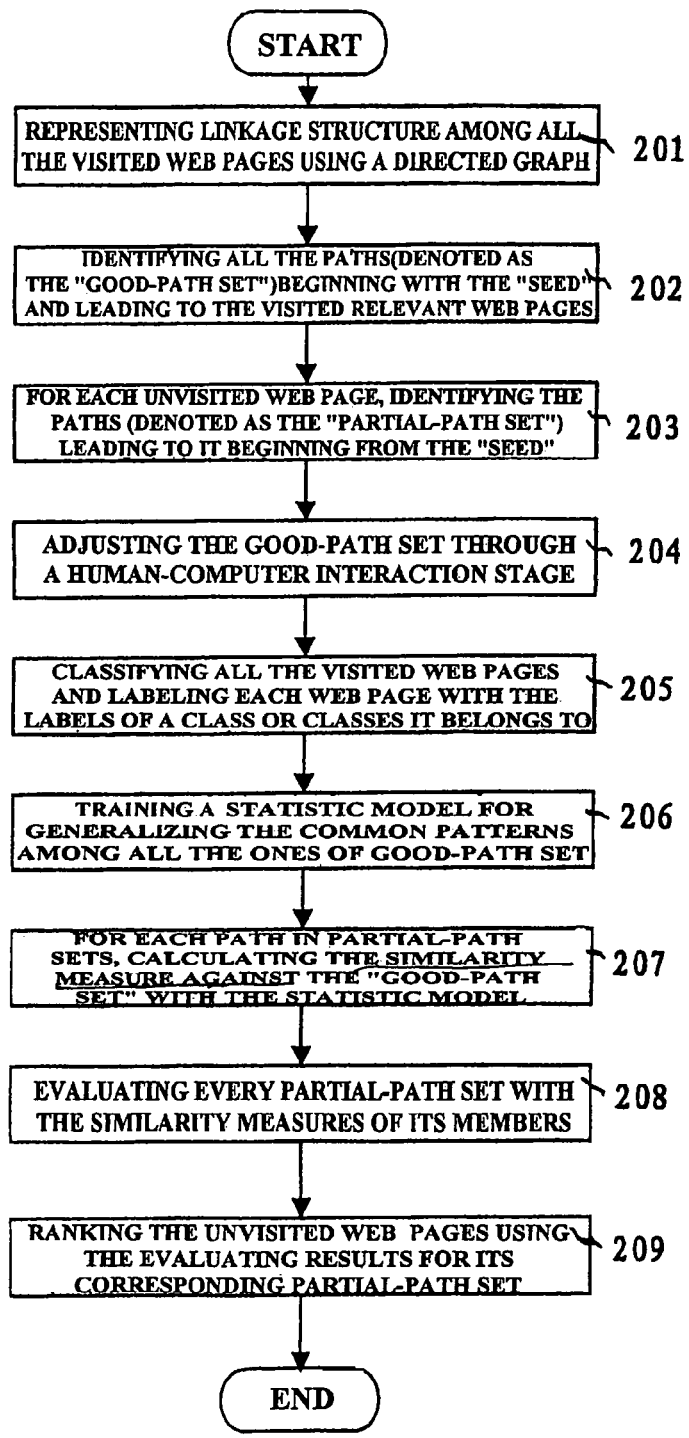
FIG. 2 shows a method for path-based ranking of unvisited Web pages according to a preferred embodiment of the invention.

FIG. 2 shows a method for path-based ranking of unvisited Web pages according to a preferred embodiment of the invention. As shown in FIG. 2, according to one preferred embodiment, the path-based ranking of unvisited Web pages process is as follows:

(201) Representing linkage structure among all the visited web pages with a directed graph, which consists of web pages as nodes and links between pages as edges;

(202) Identifying all the paths beginning with the "seed" and leading to the visited relevant web pages (denoted as the "good-path set");

(203) For each unvisited web page, identifying the paths leading to it (denoted as the "partial-path set" corresponded to the unvisited web page) beginning from the "seed".

(204) Adjusting the good-path set through a Human—Computer Interaction stage;

(205) Classifying all the visited web pages and labeling each web page with the labels of a class or classes it belongs to;

(206) Training a statistic model for generalizing the common patterns among all the ones of good-path set;

(207) For each path in partial-path sets, calculating the similarity measure against the "good-path set" with the statistic model;

(208) Evaluating every partial-path set with the similarity measures of its members;

(209) Ranking the unvisited web pages using the evaluating results for its corresponding partial-path set.

The ranking process will now be described by reference to FIGS. 4-6. The crawling path shown in FIG. 4 will be obtained after executing the following steps:

Step 201: drawing out the linkage structure in a directed graph; steps 202 and 203: identifying elements for the good-path set and the partial-path set; step 204: adjusting the good-path set; step 205: classifying and labeling web pages.

Figure 4:
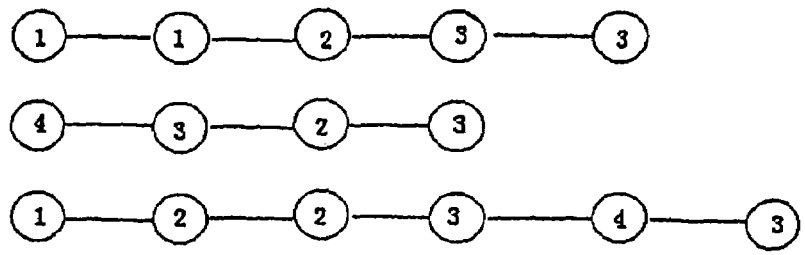
FIGS. 4-6 show an example of the crawling path.

FIG. 4 illustrates the crawling paths. The paths are with a left to right direction. The note denotes a web page with a class label (the reference number in the FIG. 4). The following description demonstrates a process by which it could label a web page for modeling and ranking.

At step 201, a feature vector that describes the web page is extracted for each web page from a set of web pages as training samples. The feature vectors may consist of the TF-IDF (Term Frequency Inverse Document Frequency) of:

(1) words in the text elements of a web page, or (2) words in the anchor text element of a web page.

The TF-IDF score e(w) of a word w is defined as the following, $$e(w) = \frac{f^d(w)}{f^d_{max}} \log \frac{N}{f(w)}$$

where $$f^d_{(w)}$$

is the number of occurrences of w in a web page document d.

$$f^d_{max}$$

is the maximum umber of occurrences of a word in the document. N is the number of documents in the corpus, and f(w) is the number documents in the corpus where the word occurs at least once.

At step 202, using the k-means algorithm or other VQ (Vector Quantify) techniques to train a cluster and its codebook.

At step 203, the ready cluster with its codebook could label any web document. It compares the feature vector of a candidate web document with all the feature vectors recorded in its codebook and classifies which class the vector should belong to. Then it assigns the corresponding label of the class to the candidate web page.

At step 204, after initial labeling, adjacent nodes may be merged into one node if they share the same label.

At step 205, each crawling path can be treated as a realization of a random process in mathematics. There exist many mathematics solutions for modeling the underlying random process based on the observed realizations.

At step 206, a random process model (also a statistic model) extracts the common patterns among the good paths. It also suggests a probability measure on any new path. As a fact, the good paths may be described by the models in the following statistic form, $$P(L_i|(L_{i-1}, L_{i-2}, \ldots, L_0)), i \geq 0 \quad (1)$$

where $L_i$ denotes a web page's label and the web page is the ith one in a path whose length is defined as i+1. ($L_{i-1}$, $L_{i-2}$, ..., $L_0$) denotes a certain path having the length of i and whose nth web page is with the label of $L_n$, $0 \leq n < i$. Such a model can be trained out by the observed samples (the ones in a good path set).

The estimation of formula (1) can be calculated in a very straight way. An example can be like this, $$P(L_i \mid (L_{i-1}, L_{i-2}, \ldots, L_0)) = \frac{f(L_{i-1}, L_{i-2}, \ldots, L_0))}{f(L_{i-1}, L_{i-2}, \ldots, L_0)}$$

Where, $f(L_{i-1}, L_{i-2}, \ldots, L_0)$ is occurrence number of such an event that a path $(L_{i-1}, L_{i-2}, \ldots, L_0)$ lead to a web page labeled as $L_i$, and $f(L_{i-1}, L_{i-2}, \ldots, L_0)$ denotes the occurrence number of such a path $(L_{i-1}, L_{i-2}, \ldots, L_0)$ in the training set.

At step 207, for ranking any a new path, it could define the measurement of any a path as Mea ($Path_x$) which suggests the similarity between the path and the good path set. The measurement is a function like these formulas, $$Mea(Path_x) = P(Path_x) \qquad (2)$$

or $$Mea(Path_x) = \sum_N C(N) * \sum_{Path_y^N} P(T, Path_y^N, Path_x) \qquad (3)$$

where T denotes a target web page. The $Path_y^N$ is a path in length N. C(N) is a cost weight associated with the distance between the current page and the target.

The difference between formula (2) and formula (3) is that: The measurement in formula (2) only depends on history of crawling to the current page. The measurement in formula (3) also considers the paths to be followed before reaching the target.

The probability P(iⓆ)in the formulas could be further expanded as the following, $$P(Path_x) = P(L_i, L_{i-1}, L_{i-2}, \ldots, L_0) \qquad (4)$$

The probabilities are indeed calculable under the model, $$P(L_i, L_{i-1}, L_{i-2}, \ldots, L_0) = P(L_i \mid (L_{i-1}, L_{i-2}, \ldots, L_0)) * \qquad (5)$$
$$P(L_{i-1}, L_{i-2}, \ldots, L_0)$$
$$= P(L_i \mid (L_{i-1}, L_{i-2}, \ldots, L_0)) *$$
$$P(L_{i-1} \mid L_{i-2}, L_{i-3}, \ldots, L_0)) *$$
$$P(L_{i-2}, L_{i-3}, \ldots, L_0)$$
$$= P(L_i \mid (L_{i-1}, L_{i-2}, \ldots, L_0)) *$$
$$P(L_{i-1} \mid L_{i-2}, \ldots, L_0)) *$$
$$P(L_{i-2} \mid (L_{i-3}, L_{i-4}, \ldots, L_0)) * \ldots *$$
$$P(L_0)$$

In an implementation of this invention, other limitations and assumptions could be introduced to the properties of underlying patterns which will simplify the applications of the method in mathematics. For an example, one could assume that all the good paths be realizations of a random process with Markov Properties.

Various accumulative set functions can be applied at step 208, here two examples are given to evaluate a partial-path set x.

$$J(X) = \underset{Path_x \in X}{\text{Max}}(Mea(Path_x))$$

$$J(X) = \underset{Path_x \in X}{\text{Max}}(Mea(Path_x))$$

or with the results from above steps, step 209 is simply a numeric sorting task.

This invention allows to obtain more efficient models through modifying the training sample paths (in step 204). It gives the following example modification methods:

(1) A user may choose URLs in his "My favorite" list as targets, back-crawl all the paths leading to the targets with "connectivity server" such as Google and Altavista and append the paths into the linkage structure;

(2) A HCI engine may visualize the linkage structure and the attributes of nodes, such as the title, URL etc, to the user. Based on the supplied information, the user may delete a path from the good-path set;

(3) The invention also allows the ability of self-learning through updating the model in time. As a result, the longer does the crawler act, the better does it work.

Figure 5:
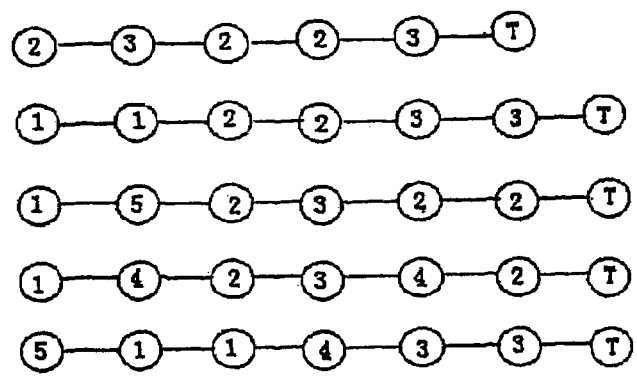
Figure 6:
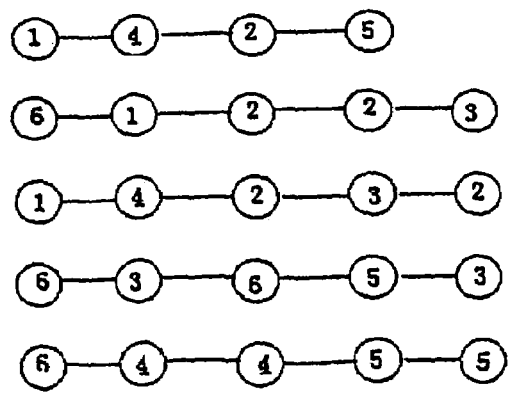

FIGS. 5 and 6 show the crawling example. FIG. 5 gives examples of possible good paths. The models derived from the samples can look like these,

P(1)=0.207, P(2)=0.345, P(3)=0.276, P(4)=0.103, P(5)=0.069

P(1|1)=0.333, P(2|1)=0.167, P(5|1)=0.167, P(4|1)=0.333,
P(2|2)=0.300, P(3|2)=0.500, P(T|2)=0.200,
P(2|3)=0.250, P(3|3)=0.250, P(4|3)=0.125, P(T|3)=0.375,
P(2|4)=0.667, P(3|4)=0.333,
P(2|5)=0.500, P(1|5)=0.500,
P(i|j)=0.001 and P(i)=0.001 for others Then the model can be used to measure the similarity between a partial path and the good path. FIG. 6 shows some partial paths. The statistic model is employed to measure the similarity of these partial paths.

Log(Mea(Path1))=−7.337
Log(Mea(Path2))=−8.027
Log(Mea(Path3))=−2.940
Log(Mea(Path4))=−15.426
Log(Mea(Path5))=−16.000

As a result, one can rank the paths by their measures. The queue of paths in crawling precedence is as (path3, path1, path2, path4, path5).

If we assign the N as 3, the result could be further modified as the followings, Log(Mea(Path1))=−7.163
Log(Mea(Path2))=−1.712
Log(Mea(Path3))=−2.064
Log(Mea(Path4))=−9.426
Log(Mea(Path5))=−12.000

Then the queue of paths becomes (path2, path3, path1, path4, path5). The result is more reasonable.

The method for path-based ranking of unvisited Web pages according to a preferred embodiment of the invention has been described by reference to the figures. The system for path-based ranking of unvisited Web pages according to a preferred embodiment of the invention will now be described by reference to FIG. 3.

Figure 3:
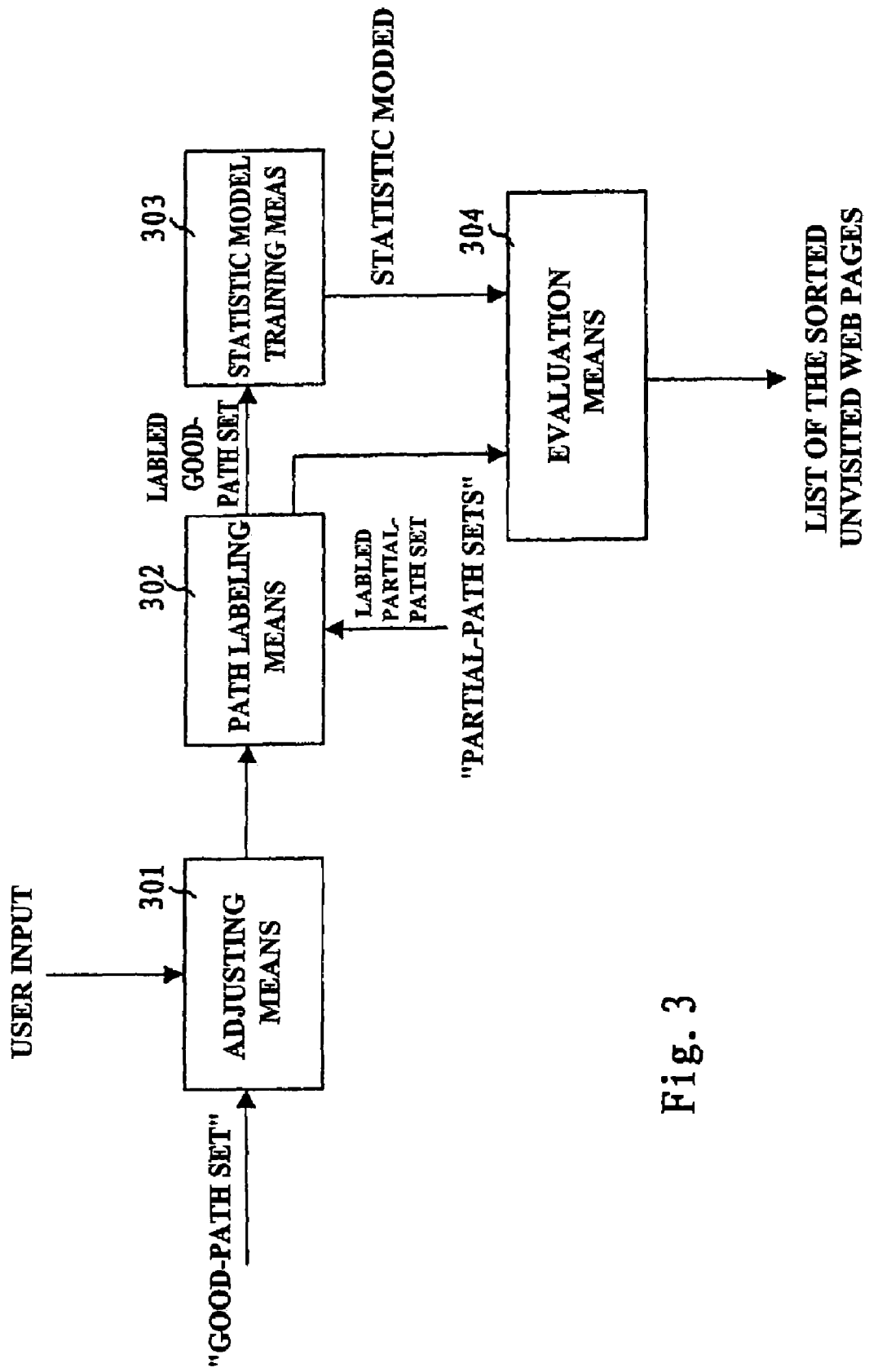
FIG. 3 shows a system for path-based ranking of unvisited Web pages according to a preferred embodiment of the invention.

As shown in FIG. 3, the system consists of following components: an adjusting means 301 that allows users to adjust the "good-path set" in interactive manner; a path labeling means 302 that classifies all the visited web pages and labels each web page with the labels of a class or classes it belongs to, the path labeling means further labels "partial-path set"; a statistic model training means 303 that learns a statistic model which generalizes the common patterns hidden in the good paths from the patterns of "good-path set"; and an evaluation means 304 that evaluates the "partial-path sets" with the statistic model and sorts the list of the unvisited web pages with the evaluation results. In the system shown in FIG. 3, the "good-path set" and the "partial-path set" may be stored in a storage unit.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer implemented method for path-based ranking of unvisited Web pages for WWW crawling, comprising:
   identifying all the paths beginning with a "seed" URL and leading to visited web pages containing content relevant to a search as "good-path set", and for each unvisited web page, identifying the paths beginning from the "seed" URL leading to it as "partial-path set";
   classifying all the visited web pages and labeling each web page with the labels of a class or classes it belongs to;
   training a statistic model for generalizing the common patterns among all ones of good-path set; and
   evaluating the partial-path sets with the statistic model to determine a similarity between the partial-path sets and all ones of good-path set and ranking the unvisited web pages with the evaluation results,
   whereby the highest ranked unvisited web pages are those most likely to contain content relevant to the search.

2. The method according to claim 1, further comprising:
   using a directed graph to represent linkage structure among all the visited web pages, wherein nodes are used to represent web pages, and edges are used to represent links between web pages.

3. The method according to claim 1, further comprising:
   adjusting the "good-path set" through Human-computer interaction stage.

4. The method according to claim 1, wherein:
   said statistic model is described by the following formula:

$$P(L_i|(L_{i-1}, L_{i-2}, \ldots, L_0)), i \geq 0 \tag{1}$$

where $L_i$ denotes a web page's label and the web page is the $i^{th}$ one in a path whose length is defined as i+1 and $(L_{i-1}, L_{i-2}, \ldots, L_0)$ denotes a certain path having the length of i and whose $n^{th}$ web page is $L_n$ where $0 \leq n < i$.

5. A method for deploying computing infrastructure, comprising integrating computer readable code into a computing system, wherein the code in combination with the computing system is capable of performing a method for path-based ranking of unvisited Web pages for WWW crawling, and further comprising the following:
   identifying all the paths beginning with a "seed" URL and leading to visited web pages containing content relevant to a search as "good-path set", and for each unvisited web page, identifying the paths beginning from the "seed" URL leading to it as "partial-path set";
   classifying all the visited web pages and labeling each web page with the labels of a class or classes it belongs to;
   training a statistic model for generalizing the common patterns among all ones of good-path set; and
   evaluating the partial-path sets with the statistic model to determine a similarity between the partial-path sets and all ones of good-path set and ranking the unvisited web pages with the evaluation results,
   whereby the highest ranked unvisited web pages are those most likely to contain content relevant to the search.

6. The method according to claim 5, further comprising:
   using a directed graph to represent linkage structure among all the visited web pages, wherein nodes are used to represent web pages, and edges are used to represent links between web pages.

7. The method according to claim 5, further comprising:
   adjusting the "good-path set" through Human-computer interaction stage.

8. The method according to claim 5, wherein:
   said statistic model is described by the following formula:

$$P(L_i|(L_{i-1}, L_{i-2}, \ldots, L_0)), i \geq 0 \tag{1}$$

where $L_i$ denotes a web page's label and the web page is the $i^{th}$ one in a path whose length is defined as i+1 and $(L_{i-1}, L_{i-2}, \ldots, L_0)$ denotes a certain path having the length of i and whose $n^{th}$ web page is $L_n$ where $0 \leq n < i$.

* * * * *